United States Patent [19]

Aoyama et al.

[11] Patent Number: 4,657,384

[45] Date of Patent: Apr. 14, 1987

[54] PHOTOELECTRIC DEVICE

[75] Inventors: Satoshi Aoyama, Osaka, Japan; Hiroshi Furukawa, Ramsey, N.J.

[73] Assignee: Minolta Camera Kabushiki Kaisha, Osaka, Japan

[21] Appl. No.: 478,917

[22] Filed: Mar. 25, 1983

[30] Foreign Application Priority Data

Mar. 27, 1982 [JP] Japan .................. 57-49470

[51] Int. Cl.⁴ .............................................. G01J 5/62
[52] U.S. Cl. .................... 356/43; 374/121; 374/133
[58] Field of Search .............. 356/43, 216, 218, 233; 374/120, 121, 124, 127, 132, 133; 350/269

[56] References Cited

U.S. PATENT DOCUMENTS

| 2,798,961 | 7/1957 | Wormser | 356/43 X |
| 2,816,232 | 12/1957 | Burstein | 374/132 X |
| 3,145,568 | 8/1964 | Yellott | 374/133 X |
| 3,293,915 | 12/1966 | Banca et al. | 374/133 X |
| 3,387,134 | 6/1968 | Treharne | 374/133 X |
| 3,448,283 | 6/1969 | Higley et al. | 356/43 X |
| 3,636,552 | 1/1972 | Orima | 350/269 X |
| 3,768,059 | 10/1973 | Day | 374/133 X |
| 4,322,129 | 3/1982 | Takahashi et al. | 350/269 |

FOREIGN PATENT DOCUMENTS 1186542 4/1970 United Kingdom .................. 356/43

Primary Examiner—Vincent P. McGraw
Assistant Examiner—S. A. Turner
Attorney, Agent, or Firm—Price, Gess & Ubell

[57] ABSTRACT

A photoelectric device for use as a radiation thermometer capable of measuring the temperature of a target without being in contact therewith is provided. The photoelectric device can include a photovoltaic cell of germanium that is suitable for a radiation thermometer capable of measuring the temperature of a target between 200 degrees c to 800 degrees c. The electrical output of the photovoltaic cell corresponding to the intensity of radiation is made independent of any change of the characteristic of the cell resulting from temperature.

7 Claims, 10 Drawing Figures

PHOTOELECTRIC DEVICE

BACKGROUND OF THE INVENTION

1. Field of the Invention

The present invention relates to a photoelectric device for converting the light intensity incident thereon into a quantity of electricity corresponding to the intensity, and more particularly relates to a photoelectric device for use in a radiation thermometer which measures a temperature of a target without being in contact therewith.

2. Description of the Prior Art

A heretofore proposed radiation thermometer includes a photoelectric device for converting the light intensity into the quantity of electricity corresponding thereof. The photoelectric device contains a photoelectric element having a light receiving surface to convert the intensity of the light incident on the light receiving surface into the quantity of electricity corresponding thereof. The proposed radiation thermometer can measure the temperature of a target distant therefrom based on the converted quantity of electricity corresponding to the intensity of the light which has been radiated from the target and incident on the light receiving surface of the photoelectric element. Therefore, the radiation thermometer is used with the light receiving surface directed toward a target whose temperature should be measured.

However, a photoelectric element generally has a characteristic that the rate of the conversion from the light intensity into the quantity of electricity changes with the temperature of the element. Therefore, unless such are taken into consideration, error will occur in the measurement by a radiation thermometer. To avoid this error, the following methods have been proposed:

(1) One method is to compensate the quantity of electricity converted by the photoelectric element for the temperature thereof. It is necessary to previously measure the change of the conversion rate of the photoelectric element with the change of the temperature thereof, and to locate a temperature sensor such as a thermocouple or a thermistor close to the photoelectric element. According to this method, the quantity of electricity of the photoelectric element is compensated based on the characteristics thereof of previously measured and the temperature measured by the temperature sensor.

(2) Another method is to keep the photoelectric element at a constant temperature. It is necessary to locate a temperature control device close to the photoelectric element in addition to the temperature sensor as described above. The temperature of the photoelectric element is kept at constant by the temperature control device which operates based on the temperature measured by the temperature sensor.

However, in both methods as described in (1) and (2), since it is necessary to locate a temperature sensor close to the photoelectric element, the photoelectric device including the temperature sensor can not be compact in size. The photoelectric device using the method (2) will be more cumbersome since it requires a temperature control device which must be located close to the photoelectric element in addition to the temperature sensor. Furthermore, since the temperature measured by the temperature sensor is not the temperature of the photoelectric element itself, the correct temperature compensation based on the temperature of the photoelectric element itself or the precise temperature control based on the temperature of the photoelectric element itself is impossible. Furthermore, since the speed of the temperature change of the photoelectric element is ordinary different from that of the temperature sensor, the correct and quick temperature measurement can not be achieved by the radiation thermometer using the method (1) or (2).

SUMMARY OF THE INVENTION

An object of the present invention is to provide a photoelectric device which is free from the defect of the conventional devices as described above, and which is suitable for a radiation thermometer capable of measuring quickly and correctly the temperature of a target without being in contact therewith.

Another object of the present invention is to provide a photoelectric device capable of converting the intensity of the light incident on its light receiving surface into the quantity of electricity only corresponding to the light intensity and independent of the temperature of the photoelectric element included therein.

Further object of the present invention is to provide a photoelectric device which includes a photovoltaic cell of germanium as the photoelectric element, and which can convert correctly the intensity of the light incident on the photovoltaic cell of germanium into the electrical output corresponding to the intensity independent of the change of the characteristics of germanium with the change of the temperature of the photovoltaic cell.

Still further object of the present invention is to provide a photoelectric device which includes a photovoltaic cell of germanium, and which is suitable for a radiation thermometer capable of measuring the temperature of a target within the middle temperature range of about 200° C.–800° C.

DETAILED DESCRIPTION OF THE PREFERRED EMBODIMENTS

Figure 1:
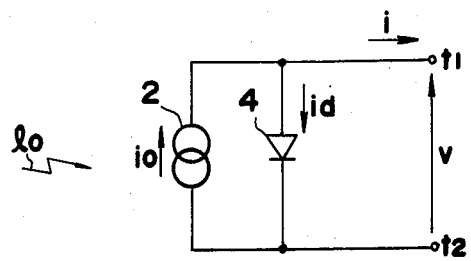
FIG. 1 shows an equivalent circuit of a photovoltaic cell which is used in embodiments of the present invention.

In FIG. 1, there is shown an equivalent circuit of a photovoltaic cell used in embodiments of the present invention. A current source 2 produces a current which corresponds to the intensity $l_o$ of the light incident on the photovoltaic cell. A diode 4 is connected in parallel with the current source 2. The following equation is held.

$$i = i_o - i_d \qquad (1)$$

wherein, i indicates the output current flowing out from the photovoltaic cell as shown, and $i_d$ indicates the current flowing through the diode 4.

Figure 2:
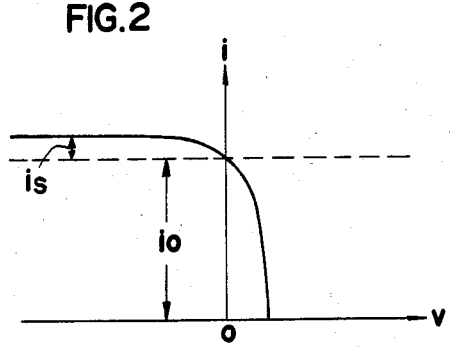
FIG. 2 shows the relation between the voltage v applied to the photovoltaic cell and the output current i of the cell.

Supposed that the temperature of the cell is kept constant, and that a voltage v is supplied for terminals $t_1$ and $t_2$, the relation between the voltage v and the output current i is shown in FIG. 2. In FIG. 2, $i_o$ indicates the above current proportional to the light intensity $l_o$, and $i_s$ indicates an inverse saturation current of the diode 4 which depends on the supplied voltage v.

The current $i_o$ and $i_d$ in equation (1) are further depending on the temperature of the photovoltaic cell itself, and are represented by the following equations:

$$i_o = l_o \times f(t) \qquad (2)$$

$$i_d = i_s (e^{gv/kt} - 1) \qquad (3)$$

wherein, $l_o$ is the intensity of the ight incident on the photovoltaic cell, $i_s$ is the inverse saturation current as described above, g is a constant proper to the diode 4, v is the voltage supplied for the photovoltaic cell, k is the Boltzmann's constant, and t is the absolute temperature of the photovoltaic cell.

Supposed that the supplied voltage v has a negative value, and that the term $e^{gv/kt}$ can be ignored since the term is much smaller than 1, the equation (3) is modified to $$i_d = i_s \qquad (4)$$

Accordingly, the equation (1) is rewritten to $$i = i_o + i_s \qquad (5)$$

Here, the inverse saturation current $i_s$ of the diode 4 is also depending on the temperature of the photovoltaic cell, and is represented by $$i_s = g(t) \qquad (6)$$

The present invention is based on a novel basic principle that, the above currents $i_o$ and $i_s$ are obtained respectively from the output current i of the photovoltaic cell according to the equation (5) as explained after, and that the absolute temperature t of the photovoltaic cell is next calculated from the obtained inverse saturation current $i_s$ according to the equation (6), and that the obtained current $i_o$ of the current source 2 is compensated by the calculated absolute temperature t to obtain a quantity of electricity I which is only depending on the light intensity $l_o$ independent of the temperature of the photovoltaic cell.

The novel basic principle of the present invention will be formularized as follows: First, the current $i_o$ and the inverse saturation current $i_s$ are obtained from the output current i according to a method explained after. Next, the absolute temperature t of the photovoltaic cell is calculafted from the inverse saturation current $i_s$ according to the equation (6).

$$t = g^{-1}(i_s)$$

Accordingly, the equation (2) is represented by $$i_o = l_o \times f(g^{-1}(i_s))$$

Therefore, the quantity of electricity I which is only depending on the light intensity $l_o$ is calculated from the following equation;

$$I = \frac{i_o}{f(g^{-1}(i_s))} \qquad (7)$$

The quantity of electricity I is not depending on the temperature of the photovoltaic cell.

Next, there will be explained a method for obtaining the term $f(g^{-1}(i_s))$ in the equation (7), that is, the term f(t) in the equation (2) with respect to a photovoltaic cell of germanium which is used in the embodiment. In the photovoltaic cell of germanium, the term f(t) is satisfactorily approximated by a linear function of the absolute temperature t of the photovoltaic cell, which the term g(t) is satisfactorily approximated by an exponential function thereof. Therefore, the terms f(t) and g(t) are expressed as follows:

$$f(t) = A + Bt \qquad (8)$$

$$g(t) = \alpha \cdot e^{\beta t} = i_s \qquad (9)$$

wherein, A, B, $\alpha$, $\beta$ are constants determined according to characteristics of the photovoltaic cell of germanium. From the equation (9), $$\ln i_s = \ln \alpha + \beta \cdot t$$

$$t = (\ln i_s - lm\ \alpha)/\beta$$

is obtained. The following equation is obtained by substituting such absolute temperature t for the equation (8).

$$f(t) = A + B(\ln i_s - \ln \alpha)\beta \qquad (10)$$

Therefore, the equation (10) is modified as follows:

$$f(t) = a + b \cdot \ln i_s \qquad (11)$$

wherein $a = A = B \ln \alpha/\beta$ and $b = B/\beta$. In the equation (11), it should be noticed that the factors a and b are not depending on the absolute temperature t of the photovoltaic cell, and that the factor $i_s$ is depending on the absolute temperature t thereof. The equation (7) is modified by substituting the factor f(t) of the equation (11) as follows:

$$I = \frac{i_o}{a + b \ln i_s} \qquad (12)$$

The value I obtained by the equation (12) is only depending on the intensity of the light incident on the photovoltaic cell independent of the temperature of the photovoltaic cell. Therefore the light intensity $l_o$ is converted into the quantity of electricity which is only corresponding of the light intensity $l_o$ by obtaining the above value I.

Figure 3:
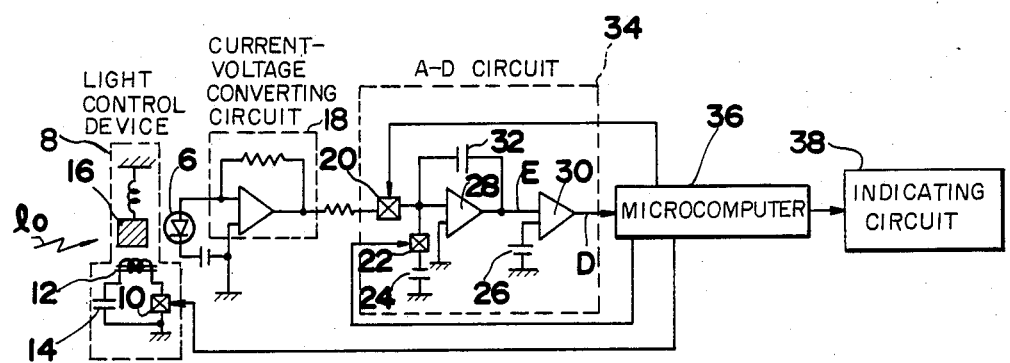
FIG. 3 shows a radiation thermometer using a photoelectric device of a first embodiment according to the present invention.

In FIG. 3, it is shown an electrical circuit of a radiation thermometer using a photoelectric device of an embodiment of the present invention. A photovoltaic cell 6 is made of germanium and its equivalent circuit is shown in FIG. 1. The embodiment is constructed such that the output current of the photovoltaic cell 6 is treated as a direct current. The light control device 8 enclosed by a broken line is located in front of the photovoltaic cell 6 to change the light receiving condition of the photovoltaic cell 6. An analog switch 10 included in the light control device 8 is enabled and disabled repeatedly at a constant period under the control of a micro-computer 36 as explained later. Furthermore, the light control device 8 includes an electromagnet 12, a power source 14, and a shielding plate 16. The shielding plate 16 is movable between a shielding position for interrupting the light which will be incident on the photovoltaic cell and a retracted position not to interrupt such light, and is urged by a spring toward the retracted position.

Figure 4:
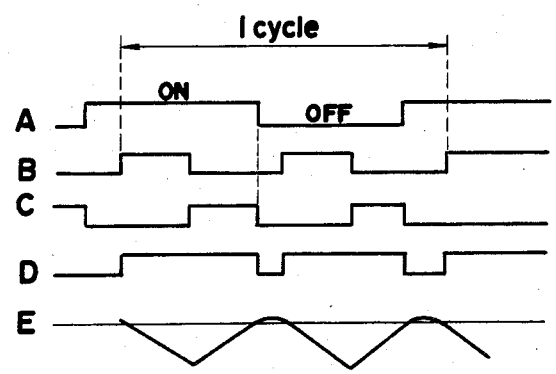
FIG. 4 shows timing-charts to explain the operational timing of analog switches 10, 20, 24 and the voltage change at the points D and E shown in FIG. 3.
Figure 5:
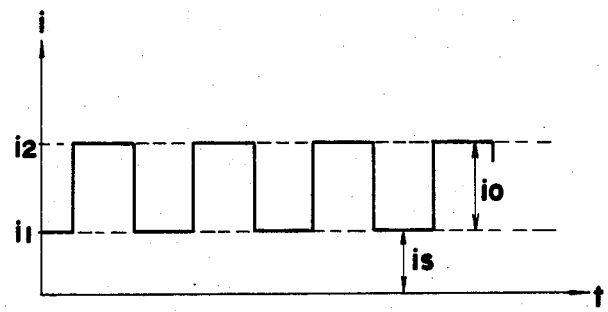
FIG. 5 shows the change of the output current of the photovoltaic cell 6 in the first embodiment.

The analog switch 10 is enabled and disabled repeatedly at a constant period as shown in a timing-chart A in FIG. 4. In the first state when the analog switch 10 is enabled, the electromagnet 12 is energized to attract the shielding plate 16 in order to locate the shielding plate 16 on the shielding position which is in front of the photovoltaic cell 6, whereby the photovoltaic cell 6 receives no light radiated from the target whose temperature should be measured Therefore, the output current $i_1$ of the photovoltaic cell 6 is equal only to the inverse saturation current $i_s$ in the first state ($i_1 = i_s$). On the other hand, in the second state when the analog switch 10 is disabled, since the electromagnet 12 is not energized, the shielding plate 16 has been retracted from the shielding position to the retracted position. Therefore, in the second state, since the photovoltaic cell 6 receives the light radiated from the target, the output current $i_2$ of the photovoltaic cell is equal to the sum of the inverse saturation current $i_s$ and the current $i_o$ corresponding to the light intensity $l_o$ as described above. ($i_2 = i_o + i_s$) Therefore, the output current of the photovoltaic cell 6 is alternately changed between $i_1$ and $i_2$ in response to the opening and the closing of the analog switch 10. The output current of the photovoltaic cell 6 is converted into the voltage signal corresponding thereof by a current-voltage converting circuit 18 enclosed by a broken line.

An analog-digital converting circuit 34 enclosed by a broken line includes analog switches 20 and 22, constant voltage sources 24 and 26, comparators 28 and 30 and a capacitor 32 to convert an analog signal from the current-voltage converting circuit 18 into a digital signal corresponding thereto. The analog switches 20 and 22 are enabled and disabled repeatedly at respective periods under the control of the micro-computer 36 as shown in timing-charts B and C of FIG. 4. If the voltage signal at an input terminal E of the comparator 30 changes as shown in a timing-chart E of FIG. 4, the voltage signal at an output terminal P of the comparator 30 changes as shown in a timing-chart D of FIG. 4. The analog-digital converting circuit 34 is converting the analog voltage signal from the current-voltage converting circuit 18 into the digital voltage signal corresponding thereto to send the digital signal to the micro-computer 36.

The micro-computer 36 operates to calculate the current $i_o$ and the inverse saturation current $i_s$ based on the digital signal corresponding to $i_1$ and $i_2$, and to calculate the quantity of electricity I according to the equation (12) by using the calculated currents $i_o$ and $i_s$. The micro-computer 36 further operates to calculate a radiation temperature Tm of the target based on the quantity of electricity I calculated. The micro-computer 36 further calculates the radiation temperature Tm over the predetermined cycles to send an output signal representative of a measured radiation temperature $T_o$ which is equal to an average value of the radiation temperature values calculated over the predetermined cycles. An indicating circuit 38 indicates the measured radiation temperature To according to the output signal from the micro-computer 36.

Assuming that the light intensity measured by the photoelectric device is lm, the radiation temperatre Tm can be obtained from the quantity of electricity I corresponding of the measured light intensity lm according to the following equation:

$$I/I_i = \int P(\lambda,T_m)S(\lambda)d\lambda / \int P(\lambda, T_i)S(\lambda)d\lambda \quad (13)$$

wherein, $I_i$ represents a quantity of electricity corresponding to a predetermined light intensity $l_i$ in a correcting mode of the radiation thermometer as described later, and $T_i$ represents a radiation temperature corresponding to the quantity of electricity $I_i$, $S(\lambda)$ is a factor representative of the spectral sensitivity of the photovoltaic cell relating to the radiation temperature. The light intensity $l_i$ in the correcting mode of the radiation thermometer and the light intensity lm measured by the radiation thermometer are respectively represented as follows, respectively:

$$l_i = \int P(\lambda,T_i)d\lambda$$

$$l_m = \int P(\lambda,T_m)d\lambda$$

In practice, the calculation of the radiation temperature $T_m$ from the factor $\int P(\lambda,T_m)S(\lambda)d\lambda$ of the equation (13) has been computed in advance. Therefore, the temperature $T_m$ is calculated from the factors $\int P(\lambda,T_i)S(\lambda)d\lambda$ and $I_i$ in the correcting mode and the factor $\int P(\lambda,T_m)S(\lambda)d\lambda$ obtained in a measuring mode as described later.

As explained above, according to the embodiment, the quantity of electricity which corresponds only to the light intensity independent of the temperature of the photovoltaic cell can be obtained by the temperature compensation of the output current of the cell based on the characteristics of the cell previously measured. Therefore, the photoelectric device of the embodiment can be simple in construction and compact compared to a conventional device, because it is not necessary to locate the temperature sensor close to the photoelectric cell. Furthermore, since the temperature compensation is executed based on the temperature of the cell itself without using the temperature near the cell, the correct compensation would be achieved by the embodiment, compared with the conventional photoelectric device. Therefore, a radiation thermometer capable of correctly measuring the temperature of the target without being in contact therewith is obtained.

Although the light control device 8 in the above embodiment operates to select between the first state in which no light is received by the photovoltaic cell 6, and the second state in which any light has been radiated from the target to the cell 6 is received by the cell 6, the present invention is not limited to such light control device 8. For example, instead of the above light control device 8, a transmittance changing device capable of changing the transmittance thereof is usable, if it is located in front of the photovoltaic cell 6. The transmittance changing device such as a liquid crystal device is controlled between first and second states in which the transmittance are different from each other.

Figure 6:
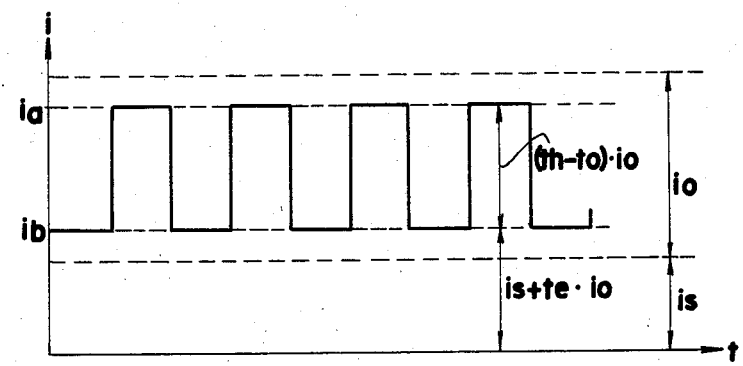
FIG. 6 shows the change of the output current of the photovoltaic cell according to the modification of the first embodiment.

Supposed that $t_h$ represents the transmittance of the transmittance changing device in the first state, and that $t_e$ represents the transmittance thereof in the second state wherein $t_h > t_l$, the output current of the photovoltaic cell would be changing as shown in FIG. 6. Therefore, the output current $i_a$ in the first state is represented by $$i_a = t_h \times i_o + i_s \qquad (14)$$

On the other hand, the output current $i_b$ in the second state is represented by $$i_b = tl \times i_o + i_s \qquad (15)$$

Since the transmittances $t_h$ and $t_l$ are predetermined values, and the output currents $i_a$ and $i_b$ are obtained from the photovoltaic cell 6, the currents $i_o$ and $i_s$ are respectively obtained from the calculation of the simultaneous equations (14) and (15). Therefore, the quantity of electricity which corresponds only to the intensity of the light incident on the photovoltaic cell independent of the temperature of the cell is obtained from the calculation of the equation (12) using the currents $i_o$ and $i_s$ obtained above.

Figure 7:
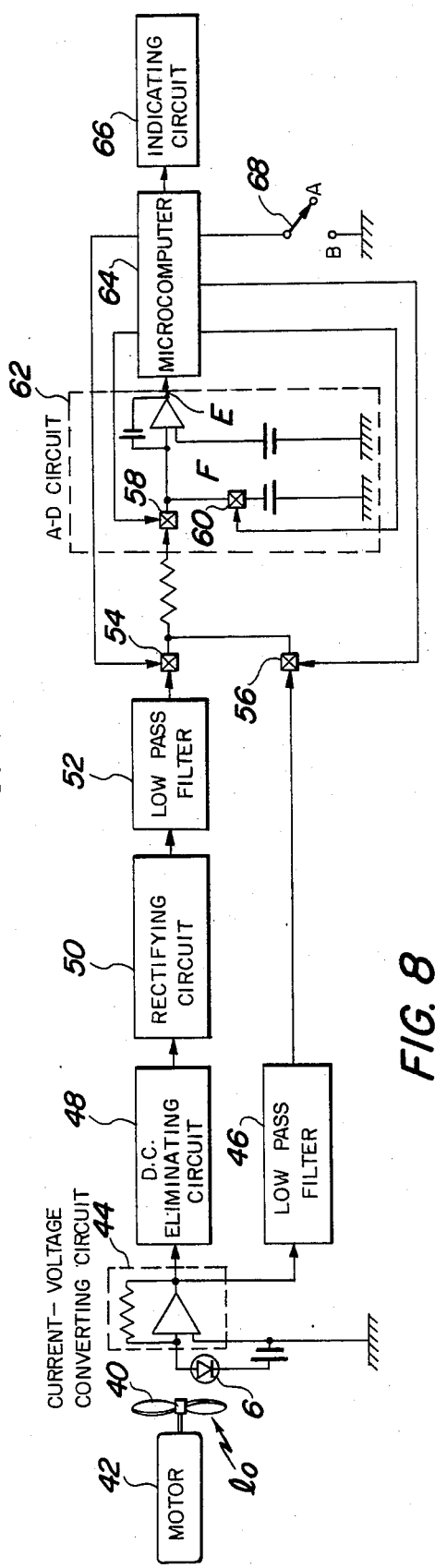
FIG. 7 shows another radiation thermometer using a photoelectric device of a second embodiment according to the present invention.

FIG. 7 shows another embodiment of the present invention. This embodiment is constructed such that a sector 40 located in front of the photovoltaic cell 6 is rotated by a motor 42 at high speed to change continuously the quantity of light incident on the cell 6, and that the direct current component and the alternate current component of the output current of the cell 6 are respectively detected to obtain the above currents $i_o$ and $i_s$. This embodiment calculates the quantity of electricity I from the currents $i_o$ and $i_s$, in the same method as the above embodiment used.

Now, it will be explained the principle of detecting the currents $i_o$ and $i_s$ respectively in this embodiment. The alternate current component $M_1$ of the output current i is represented by $$M_1 = R \cdot i_o \qquad (16)$$

, wherein R is a constant. On the other hand, the direct current component $M_2$ of the output current i is represented by $$M_2 = i_s + i_o/2 \qquad (17)$$

The equation (17) is transferred as follows:

$$i_s = M_2 - i_o/2 \qquad (18)$$

Here, if $\alpha$ is selected for satisfying $i_o/2 = \alpha M_1$, the equation (18) is rewritten to $$i_s = M_2 - \alpha M_1 \qquad (19)$$

Thus, the inverse saturation current $i_s$ is calculated from the alternate current component $M_1$ and the direct current component $M_2$.

It should be noticed that the above value $\alpha$ varies for each photovoltaic cell selected such that the inverse saturation current $i_s$ is kept at a constant independent of the change of the current $i_o$ which depends on the change of the temperature of the cell.

The current $i_o$ is obtained from the equation (16) as follows:

$$i_o = M_1/R \qquad (20)$$

It should be noticed that the constant R is selected such that, with respect to a known light intensity $l_o$, the alternate current component $M_1$ is obtained while maintaining a predetermined relation to the light intensity $l_o$. The embodiment shown in FIG. 7 calculates the quantity of electricity I from the equation (12) based on the currents $i_o$ and $i_s$ obtained from the equations (19) and (20).

In FIG. 7, a sector 40 is located in front of the photovoltaic cell 6 to control the light receiving condition of the photovoltaic cell 6. The sector 40 is rotated by a motor 42 to continuously change the quantity of light incident on the cell 6. Thus, the light receiving area of the cell 6 is changed continuously by the rotation of the sector 40. The output current i of the cell 6 is converted into a voltage corresponding thereof by a current-voltage converting circuit 44. The direct current component $M_2$ of the output current i is detected through a low-pass filter 46, while the alternate current component $M_1$ thereof is detected through a direct-current eliminating circuit 48, a rectifying circuit 50 and a low-pass filter 52.

Figure 8:
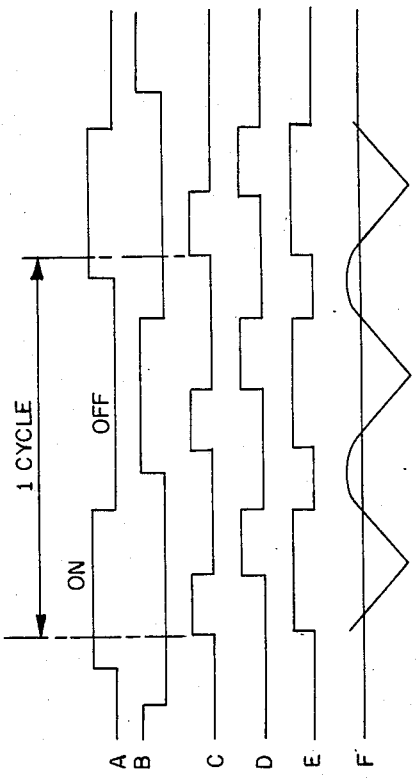
FIG. 8 shows timing-charts to explain an operational timing of analog switches 54, 56, 58 and 60 and the voltage change at the points E and F as shown in FIG. 7.

The analog switches 54, 56, 58 and 60 are respectively enabled and disabled under the control of a micro-computer 64 as shown in timing-charts A, B, C and D of FIG. 8. In the state when the analog switch 54 is enabled, the analog switches 58 and 60 are alternately enabled as shown in the timing-charts C and D of FIG. 8 to convert the analog voltage signal representative of the alternate current component $M_1$ into a digital signal corresponding thereto by an analog-digital converting circuit 62 which has the same construction as the analog-digital converting circuit 34 in FIG. 3. Such digital signal is sent to the miro-computer 64. Next after the analog switch 54 is turned to be disabled, the analog switch 56 is turned to be enabled as shown in the timing-charts A and B of FIG. 8. In this state, the analog switches 58 and 60 are alternative enabled again to sent a digital signal corresponding to the direct current component $M_2$ to the micro-computer 64. The voltage changes at the output terminal E and at the input terminal F of a comparator included in the analog-digital comparing circuit 62 are shown in timing-charts E and F of FIG. 8, respectively. Hereafter, the above operation of the analog switches is repeated under the control of the micro-computer 64 over predetermined cycles.

The micro-computer 64 calculates the currents $i_s$ and $i_o$ by the equations (19) and (20) to obtain the quantity of electricity I based on the equation (12). The micro-computer 64 further calculates the radiation temperature $T_m$ based on the equation (13). Such calculation is repeated over the predetermined cycles in the micro-computer 64 to obtain an average value $T_o$ of the calculated radiation temperature values. The micro-computer 64 send an output signal representative of the average value $T_o$ to an indicating circuit 66. The indicating circuit 66 indicates the average value $T_o$ in accordance with the signal from the micro-computer 64.

The explanation described above is relating to an operation in a measuring mode when the temperature of the target has been measuring. In the measuring mode, a switch 68 is connected to a terminal A as shown in FIG. 7. The switch 68 responds to a manual operation, and is connected to a terminal B to initially set the values a and b in the equation (12) in a correcting mode when the radiation thermometer is initially set.

Figure 9:
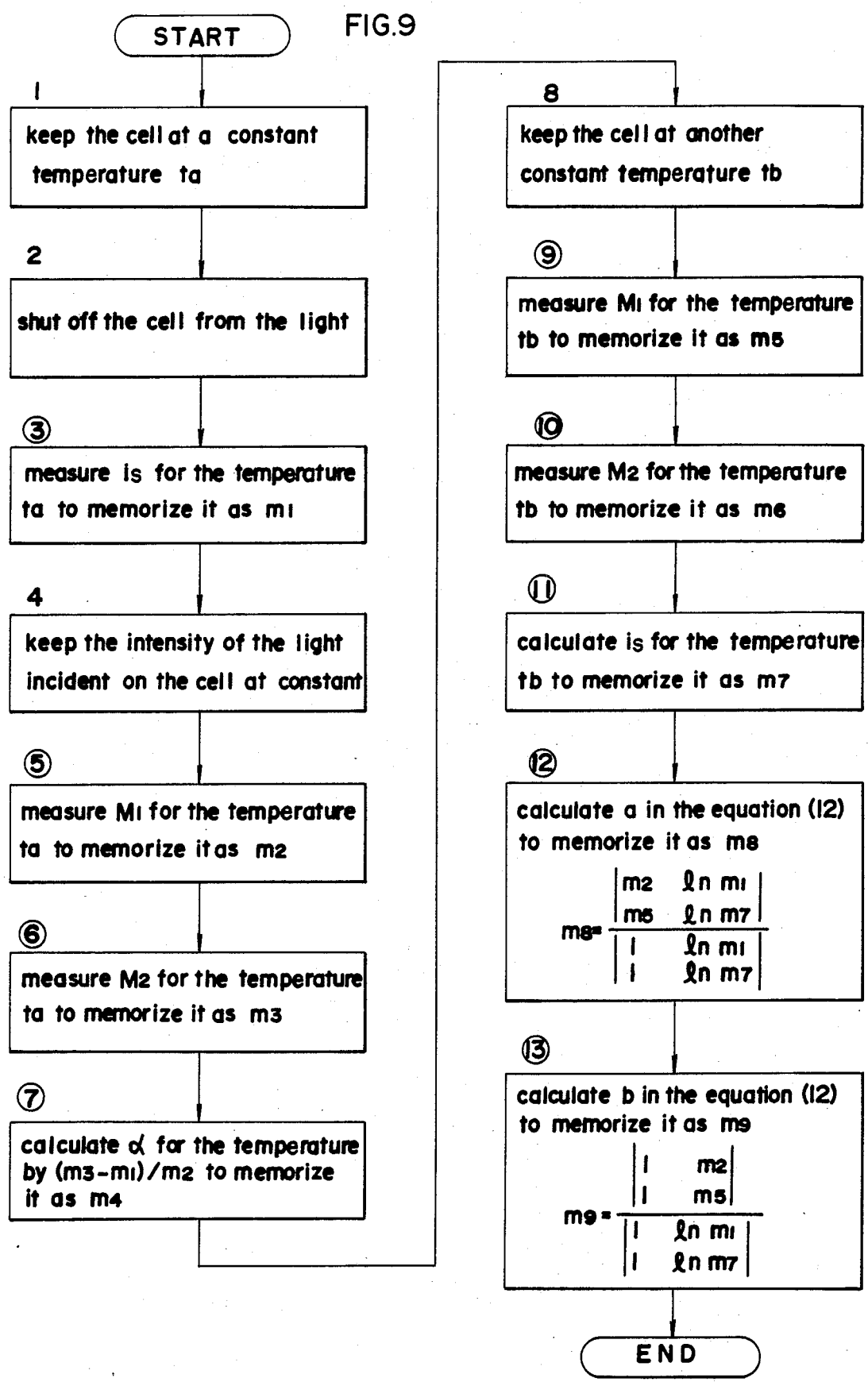
FIG. 9 is a flow-chart for representing operation of an operator and calculation process in the microcomputer 64 of the second embodiment in a correcting mode.

Operations of an operator and calculating process of the micro-computer 64 in the correcting mode will be explained below with a flow-chart of FIG. 9. In FIG. 9, a step whose number is encircled represents a calculating step of the micro-computer 64, while a step whose number is not encircled represents an operation of an operator. At first, in step 1, the photovoltaic cell 6 is kept at a constant temperature $t_a$. In step 2, any light is interrupted which would be incident on the cell 6. The inverse saturation current $i_s$ for the temperature $t_a$ is calculated by the equation (17) with the analog switches 54 and 56 being disabled and enabled respectively, and is memorized as $m_1$ in step ③. In this condition, since $i_o = 0$, $M_1 = M_2 = i_s$ is held. If such measurement of $i_s$ is completed, a display indicating the completion is executed in the indicating circuit 66. The operator keeps the intensity of the light incident on the cell 6 at a constant value $I_o$ after he recognizes the display, in step 4. In this condition, $M_1$ in the equation (16) for the temperature $t_a$ is measured from the alternative current component of the output current of the cell 6, and is memorized as $m_2$ in step ⑤. Therefore, $m_2 = M_1 = R \cdot i_o$ is held.

Next, in step ⑥, $M_2$ in the equation (17) for the temperature $t_a$ is measured from the direct current component of the output signal of the cell 6, and is memorized as $M_3$. Therefore, $m_3 = M_2 = i_s + i_o/2$ is held. In step ⑦, $\alpha$ in the equation (19) is calculated from the memorized values $m_1 - m_3$, and is memorized as $m_4$. The value $m_4$ is calculated by $(m_3 - m_1)/m_2$ based on the equation (19). Thus, the step ⑦ is a step for initially setting the value $\alpha$.

After the completion of the step ⑦, the cell 6 is kept at a constant temperature $t_b$ different from the above temperature $t_a$ in step 8. The step ⑨ ⑩ are provided for measuring $M_1$ and $M_2$ for the temperature $t_b$ by using the same manner as the step ⑤ ⑥, respectively. The measured values $M_1$ and $M_2$ are memorized as $m_5$ and $m_6$ respectively. In step ⑪, the inverse saturation current is for the temperature $t_b$ is calculated and memorized as $m_7$. In step ⑫, the value a in the equation (12) is calculated and memorized as $m_8$. Furthermore, the value b in the equation (12) is calculated and memorized as $m_9$. As described above, the value $\alpha$ in the equation (19) and the values a and b in the equation (12) are initially set as $m_7$, $m_8$ and $m_9$ respectively. If such setting is completed, the display representative thereof is executed.

Figure 10:
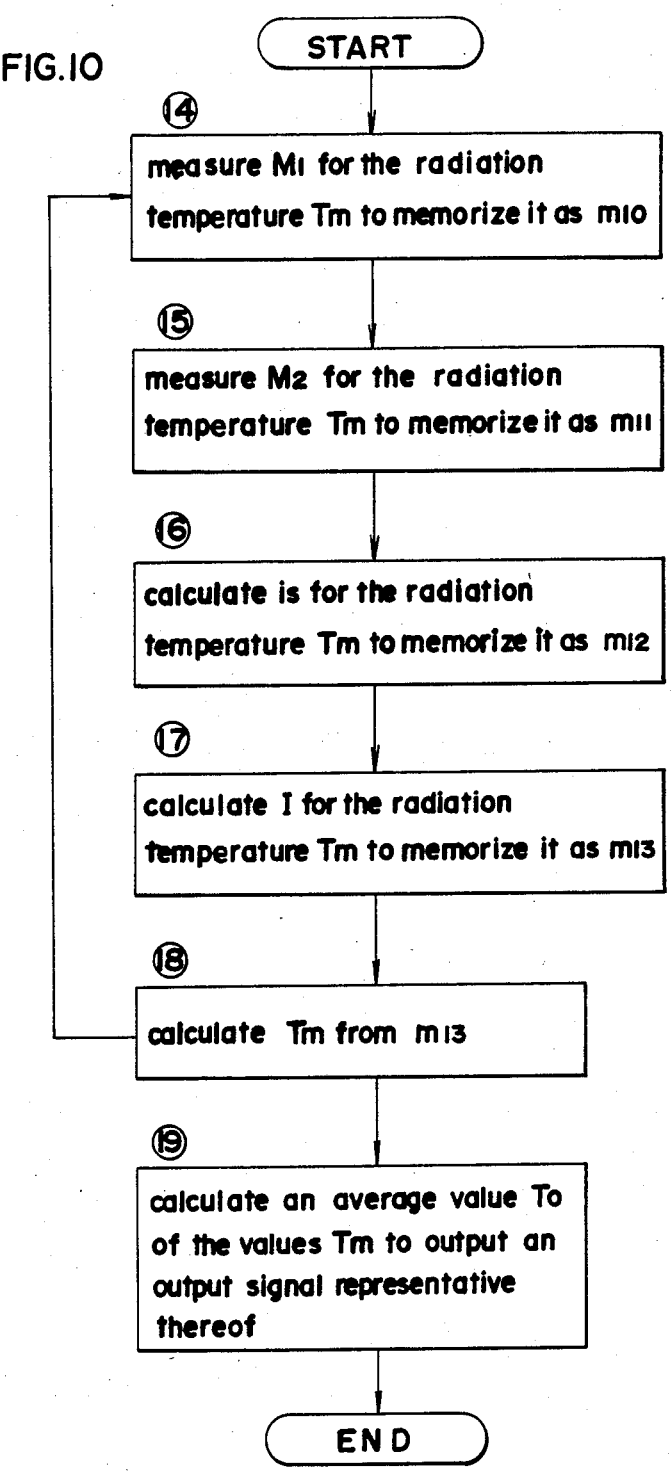
FIG. 10 is a flow-chart in a measuring mode of the second embodiment.

The calculated process of the micro-computer 64 in the measuring mode is shown in a flow-chart of FIG. 10. In the measuring mode, the switches 68 is connected to the terminal A in order to set a program of the micro-computer 64 to be suitable for the measurement. The step ⑭ and ⑮ are provided for measuring the alternate current component $M_1$ and the direct current component $M_2$ of the output current of the cell respectively, using the same manner as the step ⑤ and ⑥. The measured values $M_1$ and $M_2$ are memorized as $m_{10}$ and $m_{11}$. In the step ⑯, the current $i_s$ is calculated by $m_{11} - m_4 \cdot m_{10}$ based on the equation (19), and is memorized as $m_{12}$. In the next step ⑰, the quantity of electricity I is calculated by the equation (12) and memorized as $m_{13}$. The value $m_{13}$ is calculated by $m_{13} = m_{10}/(m_8 + m_9 \ln m_{12})$. Next, the radiation temperature Tm is calculated by the equation (13) in step ⑱. The steps ⑭ - ⑱ are repeated over predetermined cycles, and the radiation temperature $T_m$ is calculated for each cycle to calculate an average value $T_o$ of the radiation temperature values $T_m$ in step ⑲. The micro-computer 64 sends an electrical signal corresponding to the average value $T_o$ to the indicating circuit 66.

As explained above, according to this embodiment, since the temperature compensation for the output of the photovoltaic cell can be achieved without locating the temperature sensor close, to the photovoltaic cell, the photoelectric device of this embodiment can be simple in construction and compact in comparison with the conventional device. Furthermore, the correct compensation would be achieved according to the embodiment because the temperature compensation is executed based on the temperature of the cell itself. Therefore, an accurate radiation thermometer can be obtained because the temperature of the target distant therefrom can be measured under the correct temperature compensation for the output of the cell.

Furthermore, since the inverse saturation current of a photovoltaic cell of germanium is almost stable and independent of the change of the voltage supplied for the cell, the photographic device of the above embodiments which use the inverse saturation for the temperature compensation can converts the intensity of the light incident on the cell into the corresponding quantity of electricity independent of the voltage supplied for the cell. However, the present invention is not limited to the above construction which uses the inverse saturation current of the cell for the temperature compensation, but can be applied for a photoelectric element in which the relation between the temperature of the element and a current component depending only on the temperature is determined independent of the voltage supplied for the element, and in which the temperature of the photoelectric element can be determined directly from the current component.

As the embodiments described above, by using the photovoltaic cell of germanium as a photoelectric element of the photoelectric device, the photoelectric device is suitable as a radiation thermometer capable of measuring the temperature of the target without being in contact therewith within a temperature range 200°–800° C. The reason is that, in a photovoltaic cell of germanium, the current component depending on the light intensity and the temperature and the current component depending only on the temperature can be satisfactorily approximated by a linear function of the temperature and by an exponential function thereof, respectively, within the temperature range 200° C.–800° C.

What is claimed is:

1. In an improved radiation thermometer for remotely measuring a temperature of a target within the range of 200° C. to 800° C., the improvement of a light measuring apparatus consisting of:
    a photovoltaic cell having a light receiving surface for producing an output current which depends on both the intensity of the light received on the light receiving surface and the temperature of the photovoltaic cell, said photovoltaic cell is selected to satisfy the following relationship:

$$i_o = l_o \times (A+BT)$$

$$i_s = \alpha e^{\beta T}$$

wherein
- $i_o$ represents output current,
- $l_o$ represents the intensity of the light received on the cell,
- $i_s$ represents the inverse saturation current,
- T represents the absolute temperature of the cell, and
- A, B, $\alpha$ and $\beta$ are constants determined according to the characteristics of the cell respectively;

means for controlling the light receiving condition of the photovoltaic cell to change it at least between two states such that the light amount which would be received on the light receiving surface of said photovoltaic cell in the two states are made to be different from each other; and means for detecting a quantity which depends on the intensity of the light to produce an electrical signal representative of said quantity detected including means for detecting a first component which depends on the temperature, means for detecting a second component which depends on both the temperature and the intensity of the light, and means for calculating said quantity based on said first and second components detected, said first and second component detecting means detecting said components based on the change of the output current of the cell due to a change of the light receiving condition thereof, wherein said calculating means calculates the quantity according to an equation as follows:

$$I = i_o/(a + b \cdot \ln i_s)$$

wherein
- I represents said quantity,
- $i_o$ represents said first component,
- $i_s$ represents said second component, and
- a and b are constants determined according to the characteristics of said photovoltaic cell respectively.

2. The invention of claim 1, wherein said photovoltaic cell is made of germanium.

3. A photoelectric device for a radiation thermometer which measures a temperature of a target without being in contact therewith, comprising:

a photovoltaic cell having a light receiving surface for producing an output current which depends on both the intensity of the light received on the light receiving surface and the temperature of the photovoltaic cell;

means for controlling the light receiving condition of the photovoltaic cell to change it at least between two states such that the light amount which would be received on the light receiving surface of said photovoltaic cell in the two states are made to be different from each other, and means for detecting a quantity which depends on the intensity of the light to produce an electrical signal representative of said quantity detected, said detecting means calculating said quantity based on the change of the output current of said photovoltaic cell due to the change of the light receiving condition thereof by said control means, wherein said detecting means includes means for detecting a first component which depends on the temperature, means for detecting a second component which depends on both the temperature and the intensity of the light, and means for calculating said quantity based on said first and second components detected, said first and second component detecting means detecting said components based on the change of the output current of the cell due to a change of the light receiving condition thereof, and wherein said calculating means calculates the quantity according to an equation as follows:

$$I = i_o/(a + b \cdot \ln i_s)$$

wherein,
- I represents said quantity,
- $i_s$ represents said first component,
- $i_o$ represents said second component, and
- a and b are constants determined according to the characteristics of said photovoltaic cell respectively.

4. The invention of claim 3, wherein said photovoltaic cell is selected to satisfy the relation as follows:

$$i_o = l_o \times (A+BT)$$

$$i_s = \alpha e^{\beta T}$$

wherein
wherein
- $l_o$ represents the intensity of the light received on the cell,
- T represents the absolute temperature of the cell, and
- A, B, $\alpha$ and $\beta$ are constants determined according to the characteristics of the cell respectively.

5. A photoelectric device for a radiation thermometer which measures a temperature of a target without being in contact therewith, comprising:

a photovoltaic cell having a light receiving surface for producing an output current which depends on both the intensity of light received on the light receiving surface and the temperature of the photovoltaic cell;

means for controlling the light receiving condition of the photovoltaic cell to change it at least between two states such that the light amount which would be received on the light receiving surface of said photovoltaic cell in the two states are made to be different from each other; and means for detecting a quantity which depends on the intensity of the light to produce an electrical signal representative of said quantity detected, said detecting means calculating said quantity based on the change of the output current of said photovoltaic cell due to the change of the light receiving condition thereof by said control means according to an equation as follows:

$$I = \frac{i_o}{f\{g^{-1}(i_s)\}}$$

wherein,
- I represents said quantity
- $i_o$ represents as follows, and $$i_o = I_O \cdot f(t)$$

wherein, $I_O$ represents intensity of incident light;
t represents absolute temperature; and
f(t) represents a function of the absolute temperature;
$i_s$ represents inverse saturation current and satisfies the following relation:

$$i_s = g(t)$$

wherein, g(t) represents a function of the absolute temperature.

6. A photoelectric device for converting the intensity of the light received thereon into a quantity of electricity proportional only to the light intensity, comprising:
a photovoltaic cell for producing an output current which depends on both the intensity of the light received thereon and the temperature itself;
means for controlling the amount of light incident on the photovoltaic cell between a first light receiving condition in which no light is received on said photovoltaic cell and a second light receiving condition in which the light directed toward said photovoltaic cell is incident thereon;
first means for calculating a first value corresponding to inverse saturation current of the photovoltaic cell based on the output current of the photovoltaic cell in the first light receiving condition, said inverse saturation current depending on the temperature of the photovoltaic cell independently of the intensity of the light received on the photovoltaic cell;
second means for calculating, based on the output current of the photovoltaic cell in the second light receiving condition, a second value corresponding to a component which depends on both the intensity of the light received on the photovoltaic cell and the temperature of the photovoltaic cell; and
third means for calculating, based on the first and second values, a third value which depends only on the intensity of the light received on the photovoltaic cell and which is dependent of the temperature of the photovoltaic cell, said third calculating means calculating said third value according to an equation as follows:

$$I = \frac{i_o}{f\{g^{-1}(i_s)\}}$$

wherein,

I represents said third value;
$i_o$ represents as follows; and $$i_o = I_O \cdot f(t)$$

wherein, $I_O$ represents intensity of incident light;
t represents absolute temperature, and
f(t) represents a function of the absolute temperature;
$i_s$ represents inverse saturation current and satisfies the following relation:

$$i_s = g(t)$$

wherein, g(t) represents a function of the absolute temperature.

7. A photoelectric device for converting the intensity of the light received thereon into a quantity of electricity proportional only to the light intensity, comprising:
a photovoltaic cell for producing an output current which depends on both the intensity of the light received thereon and the temperature itself;
means for continuously changing the light receiving condition of the photovoltaic cell;
first means for calculating a first value corresponding to inverse saturation current of the photovoltaic cell in the first light receiving condition and that in a second light receiving condition different from the first light receiving condition, said inverse saturation current depending on the temperature of the photovoltaic cell independently of the intensity of the light received on the photovoltaic cell;
second means for calculating, based on the output current values of the photovoltaic cell in the first and second light receiving conditions, a second value corresponding to a component which depends on the intensity of the light received on the photovoltaic cell and the temperature of the photovoltaic cell; and
third means for calculating, based on the first and second values, a third value which depends only on the intensity of the light received on the photovoltaic cell and which is independent of the temperature of the photovoltaic cell, said third calculating means calculating said third value according to an equation as follows:

$$I = \frac{i_o}{f\{g^{-1}(i_s)\}}$$

wherein

I represents said third value;
$i_o$ represents as follows; and $$i_o = I_O \cdot f(t)$$

wherein, $I_O$ represents intensity of incident light;
t represents absolute temperature; and
f(t) represents a function of the absolute temperature;
$i_s$ represents inverse saturation current and satisfies the following relation:

$$i_s = g(t)$$

wherein, g(t) represents a function of the absolute temperature.

* * * * *